(12) United States Patent  
Wiedeman et al.

(10) Patent No.: US 7,532,576 B2
(45) Date of Patent: May 12, 2009

(54) SITE-TO-SITE DYNAMIC VIRTUAL LOCAL AREA NETWORK

(75) Inventors: Dennis M. Wiedeman, Cedar Park, TX (US); Eugene Baker, Austin, TX (US); Dwayne R. Potter, Round Rock, TX (US); Richard Amberg, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 876 days.

(21) Appl. No.: 10/650,106

(22) Filed: Aug. 26, 2003

(65) Prior Publication Data

US 2004/0218538 A1    Nov. 4, 2004

Related U.S. Application Data

(63) Continuation of application No. 09/426,232, filed on Oct. 22, 1999, now Pat. No. 6,654,347.

(51) Int. Cl.
*G01R 31/08* (2006.01)

(52) U.S. Cl. .................. 370/241; 370/338; 370/395.53; 702/118; 709/224; 714/712

(58) Field of Classification Search ......... 370/241–253, 370/338, 395.53, 401, 402, 389, 395, 53; 709/224, 229, 227; 714/712
See application file for complete search history.

(56) References Cited

U.S. PATENT DOCUMENTS 5,027,343 A * 6/1991 Chan et al. .................. 370/250
5,434,775 A    7/1995 Sims et al.
5,557,559 A    9/1996 Rhodes
5,596,723 A    1/1997 Romohr
5,633,869 A    5/1997 Burnett et al.

(Continued)

*Primary Examiner*—Aung S Moe
*Assistant Examiner*—Christopher P Grey
(74) *Attorney, Agent, or Firm*—Haynes and Boone, LLP

(57) ABSTRACT

A system for dynamically implementing a plurality of virtual local area networks ("VLANs") across multiple sites is provided. The system includes a first VLAN-capable switch at a first site; a first system under test ("SUT") connected to the first VLAN-capable switch via a first burn rack switch; a second VLAN-capable switch located at a second site remote from the first site; a second SUT connected to the second VLAN-capable switch via a second burn rack switch. The first and second VLAN-capable switches are connected such that the first and second SUTs are connected to a single virtual private network ("VPN"). The connection may include either first and second routers respectively connected to the first and second VLAN-capable switches and interconnected via a T1 line or an ATM connection. The system may also include a first VLAN-capable switch located at a first site; a first system under test ("SUT") connected to the first VLAN-capable switch via a first burn rack switch; a second VLAN-capable switch located at a second site remote from the first site; a customer network located at a customer site remote from the first and second sites and connected to the second VLAN-capable switch via a router; and an ATM connection between the first and second VLAN-capable switches such that the first SUT and the customer network are connected to a single virtual private network ("VPN"). In this embodiment, the connection between the second site and customer site may be either an Internet connection or a high speed point-to-point connection.

27 Claims, 10 Drawing Sheets

U.S. PATENT DOCUMENTS

| | | | | |
|---|---|---|---|---|
| 5,696,895 | A | 12/1997 | Hemphill et al. | |
| 5,752,003 | A | 5/1998 | Hart | |
| 5,892,922 | A | 4/1999 | Lorenz | |
| 5,914,938 | A * | 6/1999 | Brady et al. | 370/254 |
| 5,982,753 | A * | 11/1999 | Pendleton et al. | 370/252 |
| 6,167,537 | A | 12/2000 | Silva et al. | |
| 6,269,150 | B1 * | 7/2001 | Herrbach et al. | 379/1.01 |
| 6,285,967 | B1 | 9/2001 | Rajan et al. | |
| 6,351,769 | B1 | 2/2002 | King et al. | |
| 6,373,822 | B1 * | 4/2002 | Raj et al. | 370/252 |
| 6,477,486 | B1 | 11/2002 | Ram et al. | |
| 6,532,237 | B1 * | 3/2003 | Or et al. | 370/396 |
| 6,654,347 | B1 * | 11/2003 | Wiedeman et al. | 370/241 |
| 6,977,900 | B2 * | 12/2005 | Wiedeman et al. | 370/241 |

* cited by examiner

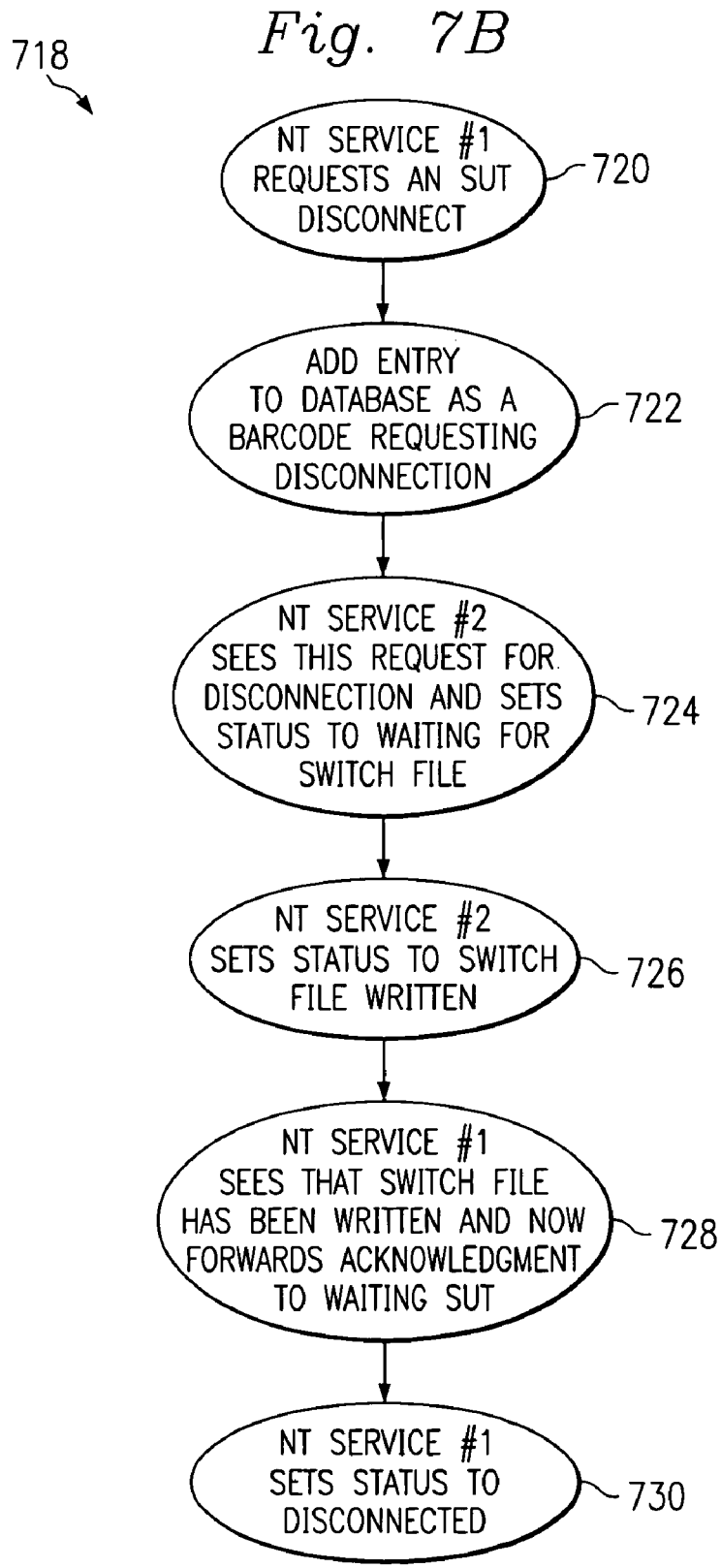

SITE-TO-SITE DYNAMIC VIRTUAL LOCAL AREA NETWORK

CROSS-REFERENCE TO RELATED APPLICATIONS

This application claims priority to and is a continuation of co-owned co-pending U.S. patent application Ser. No. 09/426,232, filed Oct. 22, 1999, by Wiedeman et al., entitled SITE-TO-SITE DYNAMIC VIRTUAL LOCAL AREA NETWORK, which is incorporated herein by reference in its entirety.

This application relates to co-owned co-pending U.S. patent application Ser. No. 10/649,508 filed concurrently herewith by Wiedeman et al., and entitled SITE-TO-SITE DYNAMIC VIRTUAL LOCAL AREA NETWORK, which is incorporated herein by reference.

This application relates to U.S. Pat. No. 6,285,967, issued on Sep. 4, 2001, entitled TROUBLESHOOTING COMPUTER SYSTEMS DURING MANUFACTURING USING STATE AND ATTRIBUTE INFORMATION, naming Subhashini Rajan, Roger Wong and Richard D. Amberg as inventors; U.S. Pat. No. 6,477,486, issued on Nov. 5, 2002, entitled AUTOMATIC LOCATION DETERMINATION OF DEVICES UNDER TEST, naming Subhashini Rajan and Roger Wong as inventors; and U.S. Pat. No. 6,351,769, issued on Feb. 26, 2002, entitled DYNAMIC BURN RACK MONITOR LISTENER SERVER, naming Robert King and Roger Wong as inventors. These patents are incorporated herein by reference in their entirety, and are assigned to the assignee of this invention.

BACKGROUND

The disclosures herein relate generally to use of virtual local area networks ("VLANs") in a manufacturing environment and, more particularly, to a technique for dynamically connecting a system under test ("SUT") to and disconnecting an SUT from a private VLAN in a computer manufacturing environment.

In a computer manufacturing environment, once a computer system is physically assembled, it is placed in a bay, or "cell," in a burn rack for testing and software configuration. Each burn rack bay includes various connectors, including a network connection for connecting a computer system, or "system under test" ("SUT"), disposed in the bay to a main manufacturing network of the manufacturer. The network connection to the main manufacturing network enables software to be downloaded to and various diagnostics to be performed on the SUT while it is disposed within the burn rack.

In some cases, several SUTs being configured for the same customer require, in addition to conventional software installation and performance of diagnostics tests, some sort of custom configuration. For example, the customer may require that one or more of its systems be configured as Microsoft Outlook® clients or as dynamic host configuration protocol ("DHCP") servers or that confidential security data be preloaded onto the system. Often, this sort of custom configuration would conflict with the main manufacturing network. For example, if an SUT is to be configured as a DHCP server, once the SUT is up and running on the network, it will begin advertising its presence and capturing and attempting to respond to requests from other SUTs on the main manufacturing network. Alternatively, it may require the transmission of data that is proprietary to the customer and hence, should not be made accessible to non-customer SUTs on the main manufacturing network. Accordingly, such custom configuration needs to be performed "off-line"; that is, off of the main manufacturing network.

In the past, this has been accomplished by physically disconnecting the SUT from the manufacturing network and performing the required custom configuration in a laboratory environment. More recently, virtual local area network ("VLAN") technology has been used to logically separate physically proximate SUTs onto separate, private, networks, providing a way to isolate a DHCP server. Previously, this has been accomplished by providing within the burn rack bay(s) a second network connection to the private network and then disconnecting the SUT from the main manufacturing network and connecting it to the private network when custom configuration is to be performed, and then reconnecting the SUT to the main manufacturing network, if necessary, after custom configuration. Clearly, the problem with this solution is that the disconnection and reconnection must be performed manually, leaving room for operator error and making it more time-consuming and expensive, in terms of operator cost, than if the connection to and disconnection from the private network at the appropriate times could be performed automatically.

In addition, the foregoing solution requires that an additional connector to each of the private networks be included in each of the burn rack bays, such that it becomes increasingly expensive with each additional private network that is required. Alternatively, several bays could be associated with each of the private networks, such that each bay would only include one additional connector to network with which it is associated. This solution is also problematic in that it requires that each SUT be placed in a particular burn rack bay, rather than the first available or most convenient burn rack bay for the SUT. In addition, manual intervention would still be required to disconnect and reconnect the SUT to the appropriate network at the appropriate times. Moreover, in each of the above-described scenarios involving VLAN technology, the SUT is statically connected to a preset VLAN.

Therefore, what is needed is a technique for implementing a dynamic VLAN ("DVLAN") arrangement in which SUTs are automatically dynamically connected to an appropriate one of a plurality of VLANs.

SUMMARY

One embodiment, accordingly, is a system for dynamically implementing a plurality of virtual local area networks ("VLANs") across multiple sites. To this end, the system includes a first VLAN-capable switch located at a first site; a first system under test ("SUT") located at the first site and connected to the first VLAN-capable switch via a first burn rack switch; a second VLAN-capable switch located at a second site remote from the first site; a second SUT located at the second site and connected to the second VLAN-capable switch via a second burn rack switch; and means for connecting the first VLAN-capable switch to the second VLAN-capable switch such that the first and second SUTs are connected to a single virtual private network ("VPN").

A principal advantage of this embodiment is that it provides a method for dynamically, rather than statically, connecting an SUT to a private VLAN in a computer manufacturing environment, thereby reducing the amount of operator intervention needed to perform custom configuration of SUTs.

Another advantage of this embodiment is that the connection of the SUT to a private VLAN can be automated, further reducing the amount of operator intervention needed to perform custom configuration of SUTs.

Another advantage of this embodiment is that it can be used to provide an "out-of-the-box" network solution for customers, in that all network components (clients and servers) can be easily configured on a separate DVLAN.

Yet another advantage of this embodiment is that it enables SUTs to be connected directly to a customer's server during custom configuration thereof.

BRIEF DESCRIPTION OF THE DRAWING FIGURES

FIG. 7B illustrates an embodiment of a DVLAN database disconnect process.

DETAILED DESCRIPTION

Figure 1:
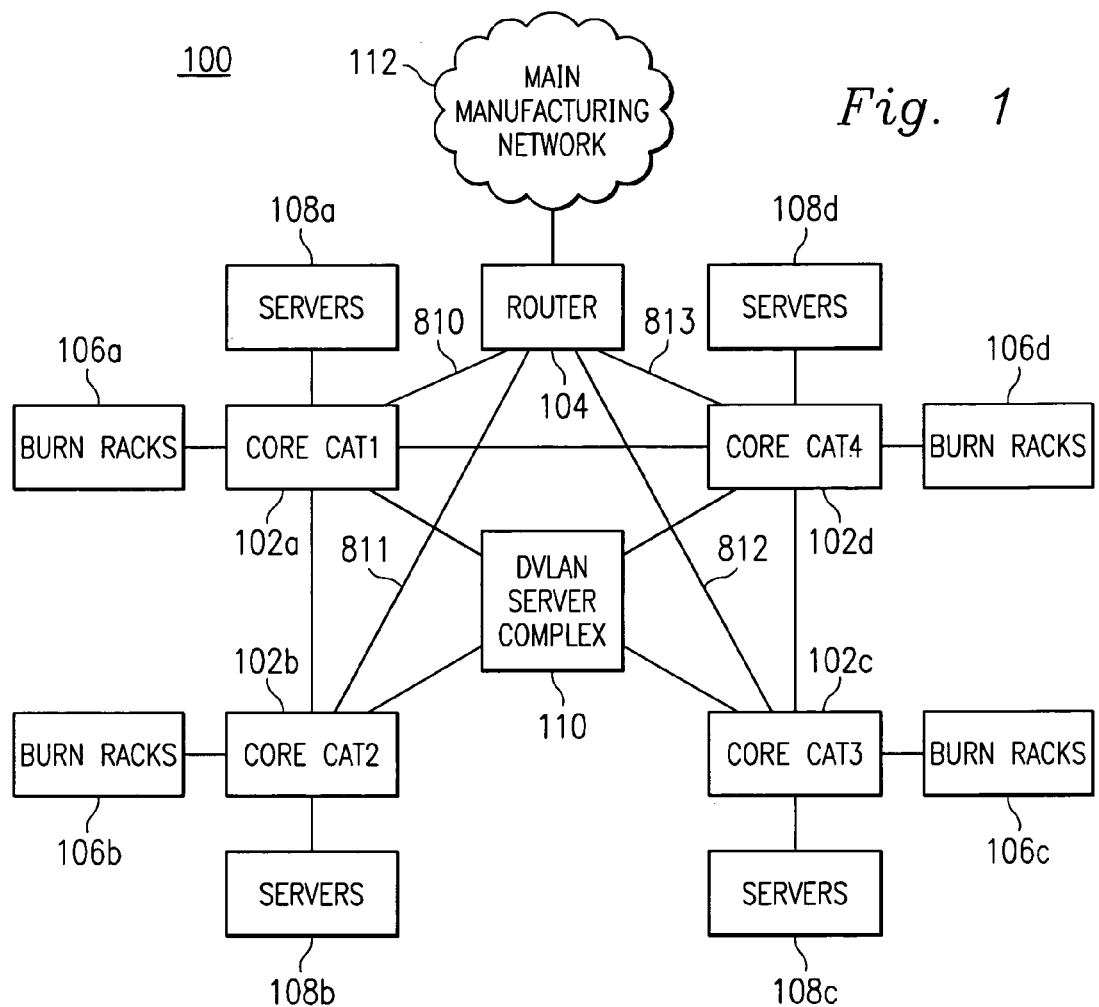
FIG. 1 is a system block diagram of a computer manufacturing environment implementing a DVLAN arrangement according to one embodiment.

FIG. 1 is a system block diagram of a computer manufacturing environment 100 implementing a DVLAN arrangement according to one embodiment. As shown in FIG. 1, the manufacturing environment 100 includes a plurality of core VLAN-capable switches (hereinafter "core CATs") 102a-102d that are interconnected by a router 104. Each of the core CATs 102a-102d is connected to a burn rack complex 106a-106d, respectively, as well as to one or more download servers 108a-108d, respectively. In accordance with an embodiment described herein, the core CATs 102a-102d are also connected to a DVLAN server complex 110 as described in greater detail below. Each of the core CATs 102a-102d is assigned a "default" or "fall back" VLAN. For example, the default VLAN for the core CAT 102a is VLAN 810. The default VLAN for the core CAT 102b is VLAN 811. Similarly, the default VLANs for the core CATs 102c and 102d are VLAN 812 and VLAN 813, respectively. None of the default VLANs is a private VLAN; that is, all of them are connected to the manufacturer's main manufacturing network 112.

Figure 1A:
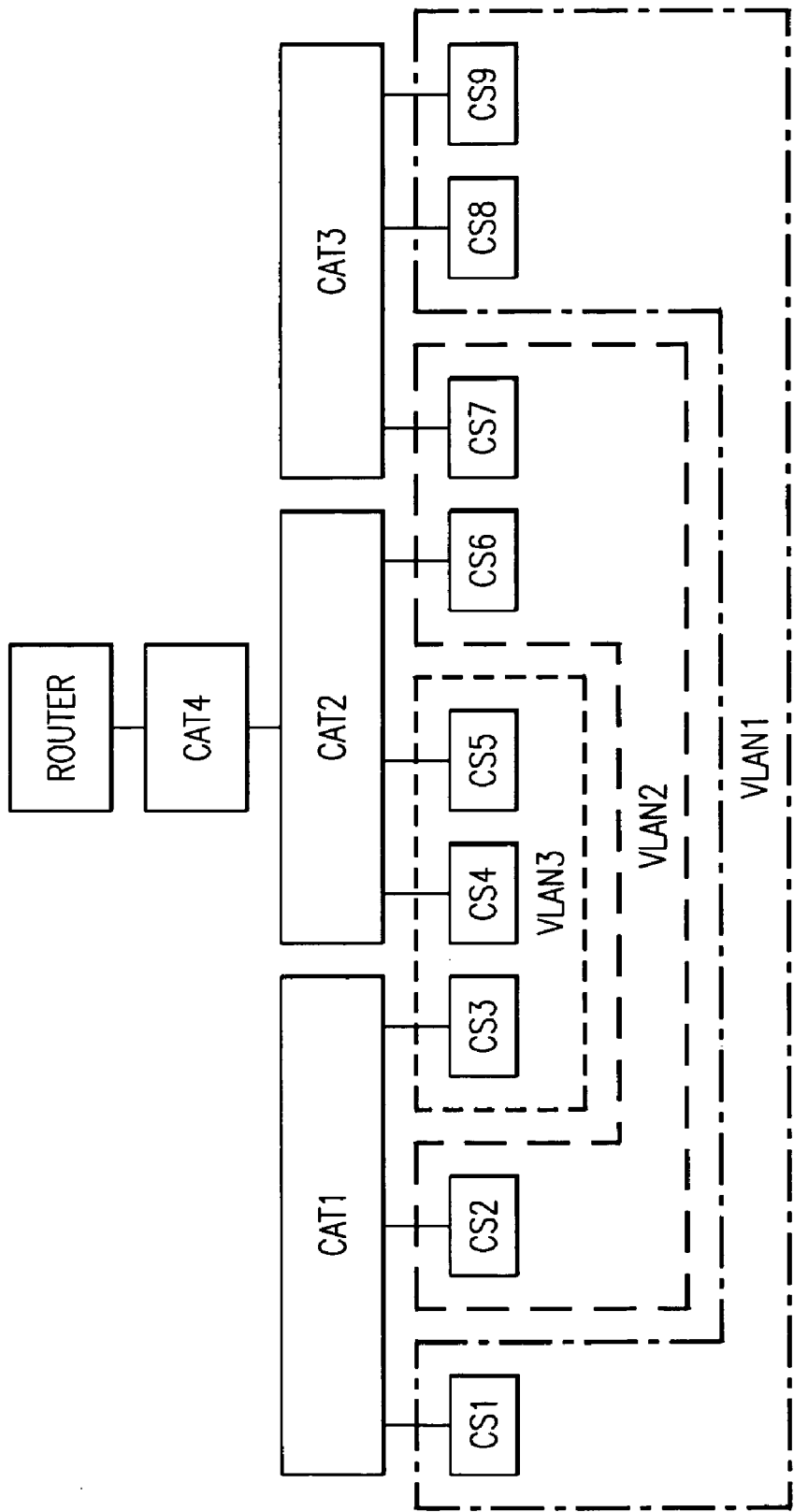
FIG. 1A is a system block diagram illustrating an embodiment of the interconnections of a plurality of computer systems.

As will be recognized by one of ordinary skill in the art, a VLAN-capable switch, or "CAT," is a switch that is capable of grouping systems connected thereto onto logically, rather than simply physically, separate networks, or "VLANs". For example, in FIG. 1A, three CATs, designated as CAT1, CAT2, and CAT3, are interconnected by a fourth CAT, designated as CAT4, which in turn is connected to a router R. Additionally, three computer systems CS1-CS3 are connected to CAT1, three computer systems CS4-CS6 are connected to CAT2, and three computer systems CS7-CS9 are connected to CAT3. As illustrated in FIG. 1A, CAT1-CAT4 are configured such that computer systems CS1, CS8, and CS9 are interconnected via a first VLAN ("VLAN1"), computer systems CS2, CS6, and CS7 are interconnected via a second VLAN ("VLAN2") and computer systems CS3, CS4, and CS5 are interconnected via a third VLAN ("VLAN3"). It will be recognized that the technique used to configure CAT1-CAT4 to accomplish the foregoing will be evident to one skilled in the art of VLAN technology.

Figure 2:
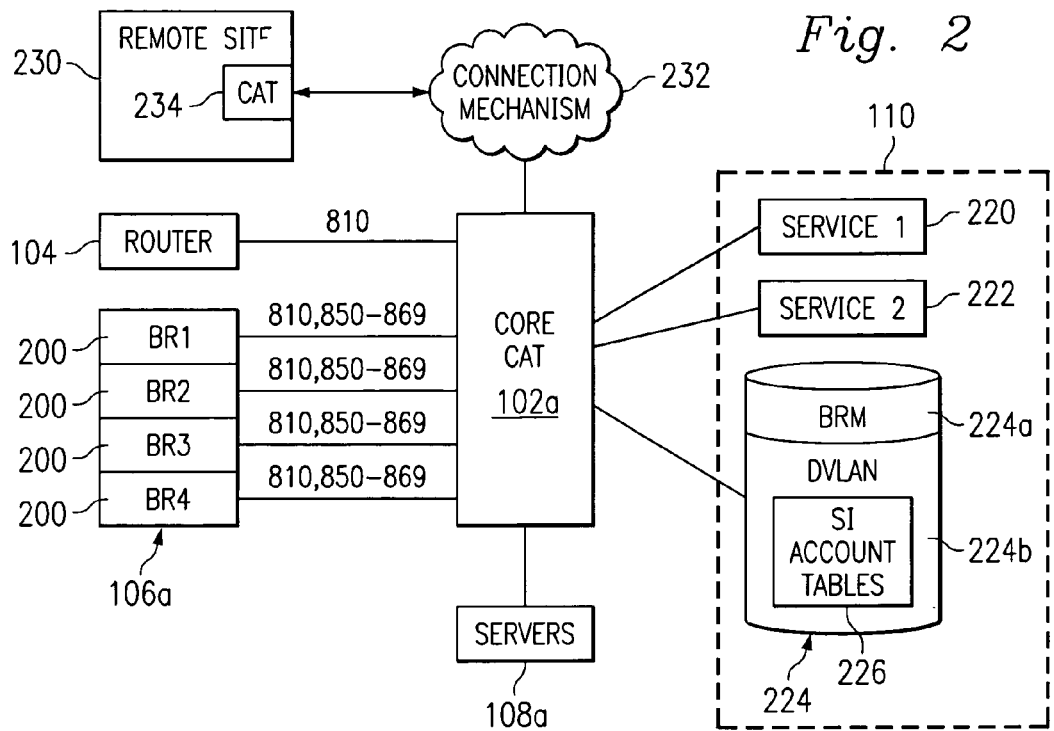
FIG. 2 is a more detailed system block diagram of a portion of the computer manufacturing environment of FIG. 1.

FIG. 2 is a more detailed system block diagram of a portion of the environment 100. It should be recognized that although only one of the core CATs 102a-102d (i.e., core CAT 102a) and one of the burn rack complexes 106a-106d (i.e., burn rack complex 106a) are shown and described in FIG. 2, the details described with respect thereto apply to the remaining core CATs 102b-102d and burn rack complexes 106b-106d as well. In particular, as shown in FIG. 2, in one embodiment, the burn rack complex 106a to which the core CAT 102a is connected includes four individual burn racks 200.

Figure 3:
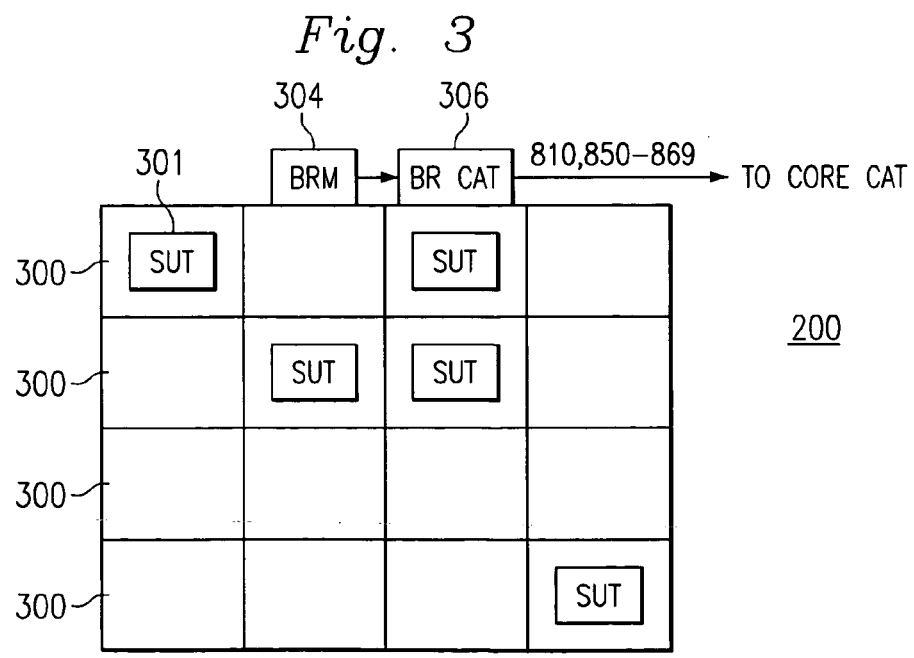
FIG. 3 is a diagram of a burn rack of the computer manufacturing environment of FIG. 1.

As shown in FIG. 3, each of the burn racks 200 includes a number of bays 300 for retaining therein an SUT, such as an SUT 301, as well as for providing a network connection between the SUT disposed therein and the manufacturing environment 100. As also shown in FIG. 3, each of the burn racks 200 includes a burn rack monitor ("BRM") 304 and a VLAN-capable switch (hereinafter "burn rack CAT") 306. Both the BRM 304 and burn rack CAT 306 are connected to each of the SUTs disposed in the bays 300 of the respective burn rack 200. In accordance with a feature of the embodiment described herein and as will be described in greater detail below, each burn rack CAT, such as the burn rack CAT 306, is capable of connecting an SUT disposed in the burn rack associated therewith onto one of a plurality of private VLANs. In one embodiment, twenty VLANs (e.g., VLAN 850 through VLAN 869) are implemented as private VLANs, although it will be recognized that the number of private VLANs that can be implemented is limited only by practical considerations.

As best shown in FIG. 2, the DVLAN server complex 110 includes a plurality of first NT services, represented in FIG. 2 as a first service 220, a second NT service 222, and a database 224 comprising a BRM database 224a and a DVLAN database 224b. It will be recognized that the functions of first and second NT services 220, 222, which will be described in greater detail below, may be implemented in any number of fashions, including a GUI. The BRM database 224a contains information about what steps the SUT has executed while in the burn rack and reports that data to a BRM GUI (not shown)

displayed on the BRM 304 (FIG. 3). The BRM database 224a records, among other things, the barcode, SI number, date/time stamps, step information, historical data, and burn rack location for each SUT. The DVLAN database contains all the information necessary to run the DVLAN, such as barcode, MAC address, VLAN, status information, VLAN account information, historical data, and time/date stamps for each SUT. It should be recognized that each of the services 220, 222, and the database 224, may reside on a single server or on multiple servers.

For purposes that will be described in greater detail below with reference to FIGS. 9-12, as shown in FIG. 2, a connection is also provided between each of the core CATs 102a-102d, represented in FIG. 2 by the core CAT 102a, and a remote site 230 via a connection mechanism 232. Another CAT 234 is provided at the remote site 230. As will also be further described in detail, the remote site may be, for example a lab of the manufacturer, a separate manufacturing facility of the manufacturer, or a customer's facility.

In one embodiment, each computer system to be manufactured is identified by a unique barcode. When an order is taken for a computer system, configuration information for the system is stored in a file identified by the system's barcode ("barcode file"). Such configuration information may include, for example, the type of hardware to be included in the system, as well as the type of operating system and applications software to be preinstalled thereon. If custom configuration is required, for example, if the system is to be configured as a DHCP server, the barcode file for the system will include an SI number. During a step-maker process, the barcode file for a system is used to create a "step diskette" therefor. The step diskette includes computer-executable instructions for causing various configuration and testing processes to be performed with respect to the system.

Referring again to FIGS. 2 and 3, during normal operation, after a computer system has been assembled on the manufacturing floor, it is placed in a bay 300 of one of the burn racks 200 and connected to a network connector to enable the system, now a "system under test" or "SUT," to be configured and tested. In particular, assuming the SUT is inserted into a bay of one of the burn racks 200 of the burn rack complex 106a, the step diskette for the SUT is inserted in the "a" drive of the SUT and the SUT is booted from the step diskette. At this point, the SUT is connected to the default VLAN, in this case, the VLAN 810, and various diagnostics are performed and software is downloaded to the SUT from the download servers 108a connected to the core CAT 102a under the control of the step diskette.

Figure 4A:
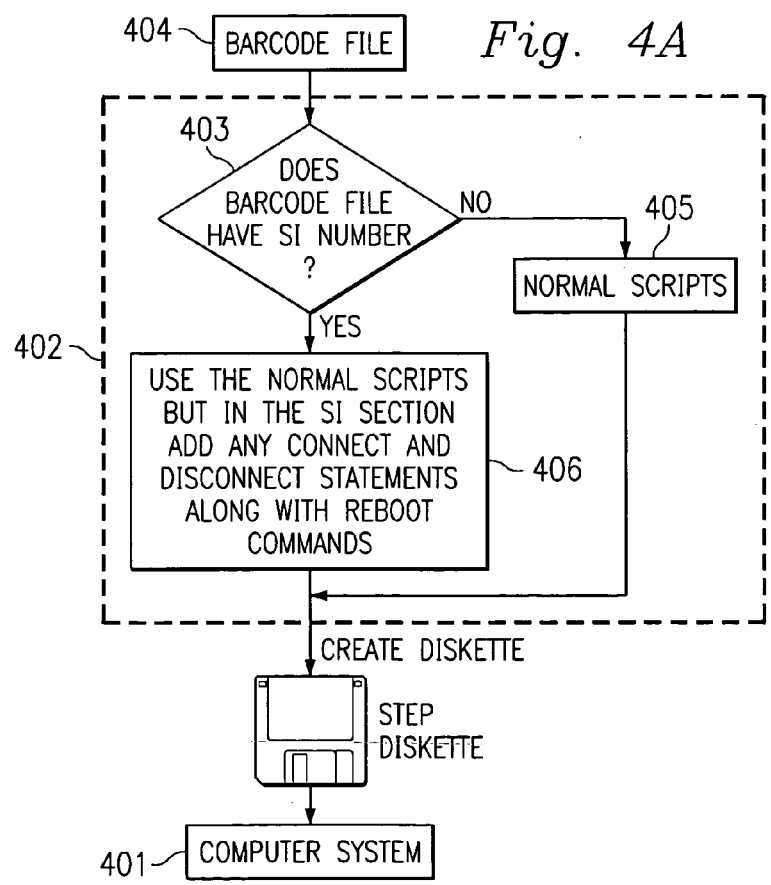
FIG. 4A illustrates a process of creating a step diskette for a computer for use in the computer manufacturing environment of FIG. 1.

FIG. 4A illustrates a process of creating a step diskette 400 for a system 401 according to one embodiment. As previously described, the creation of the step diskette a system takes place during a step maker process, designated in FIG. 4A by a reference numeral 402. In step 403 of the step maker process 402, a determination is made whether a barcode file of the system 401, represented in FIG. 4A by a barcode file 404, contains an SI number. If not, in step 405, the normal scripts are written to the step diskette 400. If the barcode file 404 does include an SI number, in addition to the normal scripts, "dv_connect" and "dv_disconnect" statements, along with corresponding reboot commands (collectively, "SI scripts"), are written in an SI section of the step diskette 400.

Figure 4B:
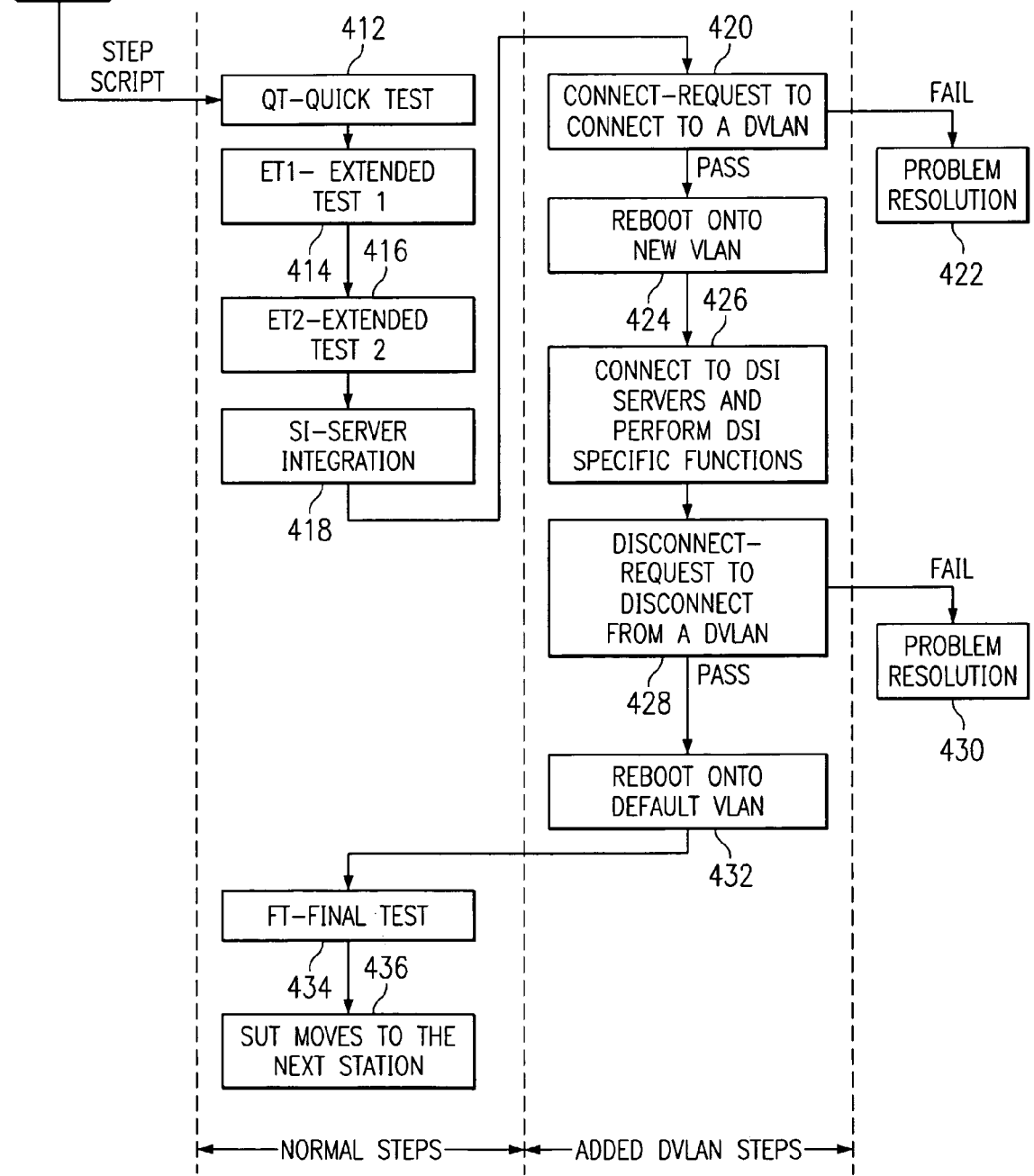
FIG. 4B is a flowchart of an embodiment of a process for connecting an SUT to and disconnecting an SUT from a private VLAN.

FIG. 4B Illustrates how a system, such as the system 401, connects to and disconnects from a private VLAN under the control of the step diskette 400. In steps 412-418, various standard tests and procedures, including a Quick Test (step 412), an Extended Test 1 (step 414), an Extended Test 2 (step 416), and Server Integration (step 418), are performed. In step 420, a connect command ("dv_connect"), which is a request to connect to a DVLAN, is executed. If the request fails, execution proceeds to step 422, in which the problem is resolved; otherwise, execution proceeds to step 424, in which the system 401 reboots onto the new VLAN. In particular, responsive to the execution of a dv_connect command, an entry is added to the copy of the switch file stored at the DVLAN database 224b containing the MAC address-to-VLAN correlation for the system 401. Once the dv_connect command is executed, the system 401 times out for two minutes to allow for the following functions to be performed. First, the core CATs 102a-102d, which are set up to check for changes in the DVLAN database copy of the switch file approximately once every minute, detect the change to the switch file. Responsive to this detection, the updated switch file is promoted to the core CATs 102a-102d. After two minutes, the system 401 reboots, checks the updated switch file stored on the respective one of the core CATs 102a-102d for an entry corresponding to its MAC address, and, finding such an entry, connects to the indicated VLAN.

In step 426, the system 401 connects to the appropriate server(s) disconnect command ("dv_disconnect"), which is a request to disconnect from the DVLAN, is executed. If the command fails, execution proceeds to step 430, in which the problem is resolved; otherwise, execution proceeds to step 432, in which the system 401 is rebooted onto the default VLAN. In particular, responsive to the execution of a dv_disconnect command, the entry containing the MAC address-to-VLAN correlation for the system 401 is deleted from the copy of the switch file stored at the DVLAN database 224b. Once the dv_disconnect command is executed, the system 401 times out for two minutes to allow for the following functions to be performed. First, the core CATs 102a-102d detect the change to the switch file. Responsive to this detection, the updated switch file is promoted to the core CATs 102a-102d. After two minutes, the system 401 reboots, checks the updated switch file stored on the respective one of the core CATs 102a-102d for an entry corresponding to its MAC address, and, failing to find such an entry, connects to the fallback VLAN for the respective core CAT.

In step 434, a Final Test is performed and in step 434, the system 401 is moved on to the next station. It should be noted that steps 410-418, 434, and 436 are normal steps in the configuration and testing process; steps 420-432 are SI scripts added by the embodiment described herein.

Although described herein as being contained on and executed from the step diskette, it should be understood that the dv_connect and dv_disconnect commands can also be manually input to the SUT 301.

Figure 5:
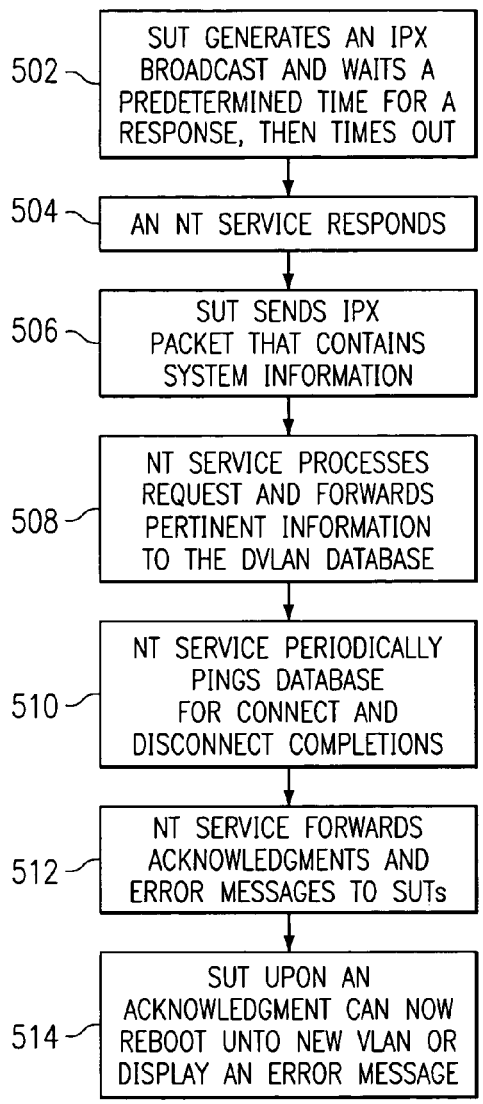
FIG. 5 is a flowchart of an embodiment of a process of an NT service collecting IPX packets and forwarding the information contained in the IPX packets to a DVLAN database.

FIG. 5 illustrates operation of the first service 220 for collecting IPX packets from an SUT and forwarding the information to the DVLAN database 224b. In step 502, one of the SUTs, such as the SUT 301 (FIG. 3) generates an IPX broadcast and waits a predetermined time period for a response, then times out. In step 504, the first service 220 (FIG. 2) responds and a connection is established between the SUT 301 and the first service 220. In step 506, the SUT 301 sends an IPX packet containing system information for the SUT. In step 508, the service 220 processes the request and forwards pertinent information, such as the SI number of the SUT 301, to the DVLAN database 224b. In step 510, the service 220 periodically pings the DVLAN database 224b for connect and disconnect completions. In step 512, the service 220 forwards an acknowledgment or an error message to the SUT 301. In step 514, the SUT 301 reboots onto the new VLAN, as will be described below (in the case of an acknowledgment) or displays an error message (in the case of an error message).

Figure 6A:
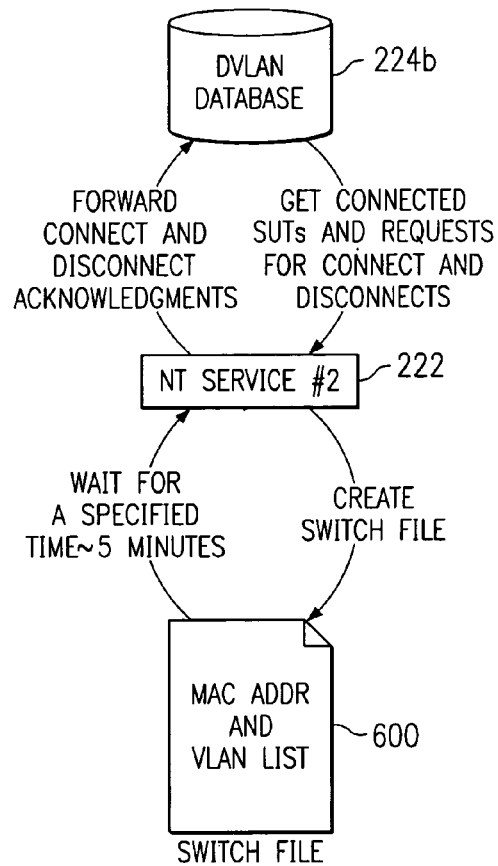
FIG. 6A is a flowchart of an embodiment of a process for creating a switch file.

FIG. 6A illustrates a method of creating a switch file 600. In particular, the second service 222 periodically polls the DVLAN database 224b for connection status information for each of the SUTs, such as the SUT 301. This connection status information includes "Connected", "Request for Connection" and "Request for Disconnection." The service 222 uses this information to create the switch file 600, which is shown and described in greater detail with reference to FIG. 6B. In general, entries consisting of MAC address-to-VLAN correlations for SUTs that are indicated as being connected or requesting connection ("dv_connect") are added to the switch file 600 and MAC address-to-VLAN correlation entries for SUTs that have requested disconnection ("dv_disconnect") are deleted from the switch file 600. After updating the switch file 600, the service 222 waits a specified amount of time and then forwards acknowledgments back to the DVLAN database 224b for SUTs requesting connection or disconnection.

Figure 6B:
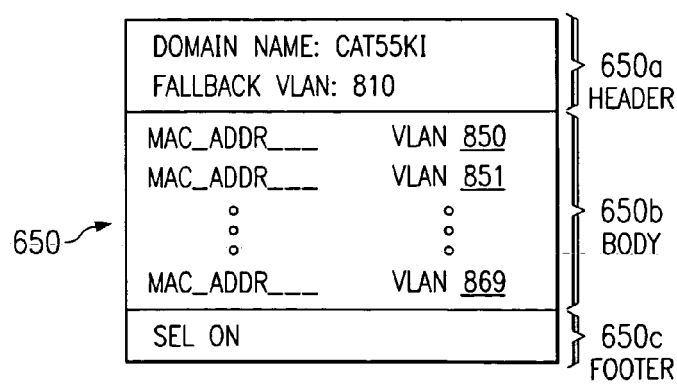
FIG. 6B illustrates an embodiment of a switch file created using the process of FIG. 6A.

FIG. 6B illustrates an exemplary switch file 650. As shown in FIG. 6B, the switch file 650 includes a header portion 650a, a body portion 650b, and a footer portion 650c. In one embodiment, each core CAT 102a-102d has its own unique switch file; the switch file 650 is for the core CAT 102a ("CAT55K1"). As a practical matter, the switch files for each of the core CATs are identical in all respects, except for the contents of the header. In particular, the header portion 650a of each of the switch files identifies, in a "Domain Name" entry, the core CAT with which the switch file is associated (in this case, the core CAT 102a), and, in a "Fallback VLAN" entry, the fallback VLAN (in this case, 810) for the core CAT. The body portion 650b consists of the MAC address-to-VLAN correlation table.

Figure 7A:
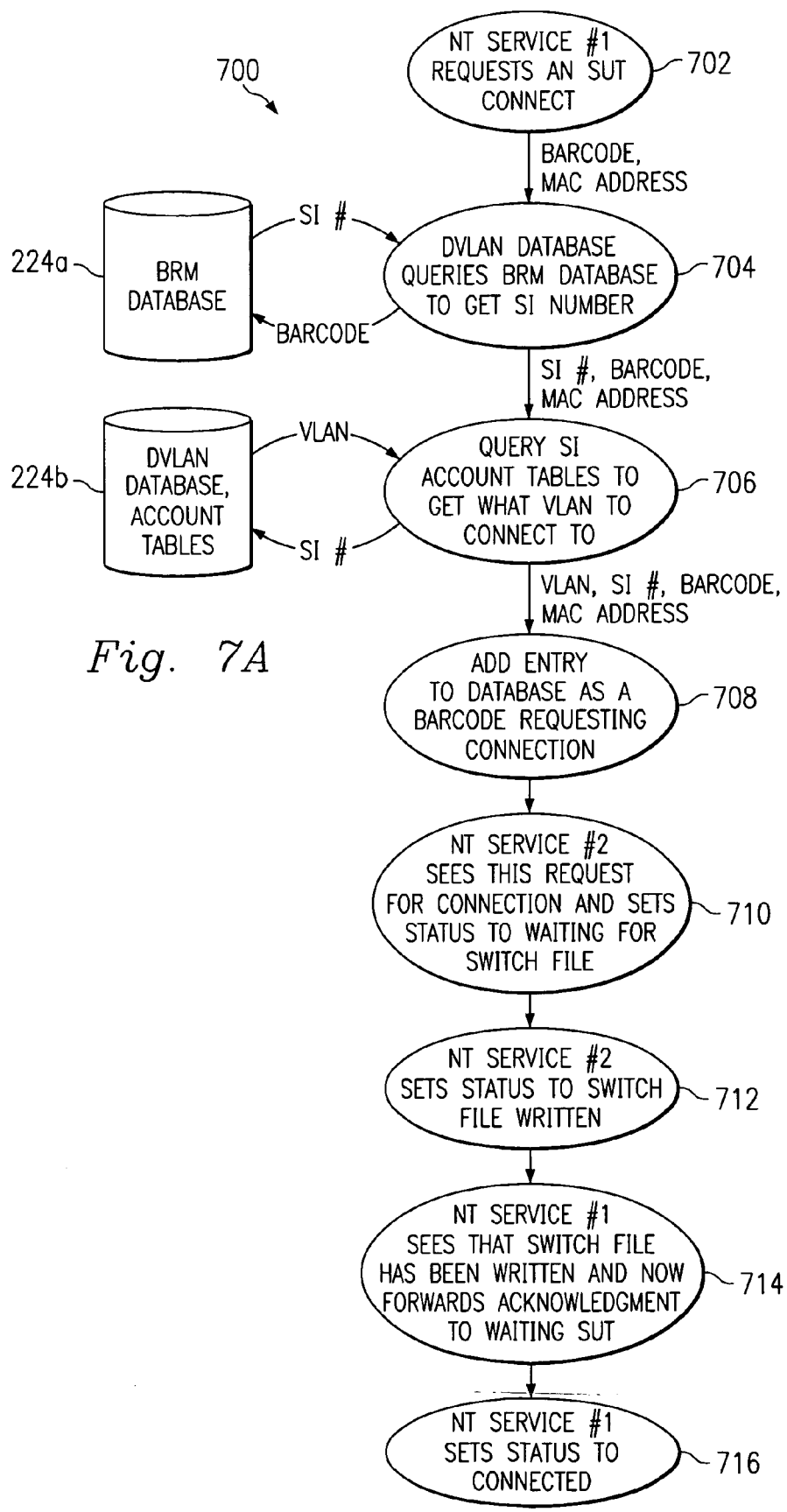
FIG. 7A illustrates an embodiment of a DVLAN database connect process.

FIG. 7A illustrates a DVLAN database connection process 700 with respect to an SUT, such as the SUT 301. In step 702, the first service 220 requests an SUT connect and sends the barcode and MAC address of the SUT 301 to the DVLAN database 224b. In step 704, the DVLAN database 224b queries the BRM database 224a, using the barcode provided by the first service 220, to obtain from the BRM database the SI number of the SUT 301. In step 706, SI account tables 226 (FIG. 2) of the DVLAN database 224b are queried to determine, based on the SI number obtained in step 704, what VLAN the SUT 301 is to be connected to. In step 708, the connect request is stored in the DVLAN database 224b In step 710, the second service 222 sees the connect request and sets the status of the SUT 301 in the DVLAN database 224b to "Waiting for Switch File Update." In step 712, after the switch file is written, the second service 222 sets the status of the SUT 301 in the DVLAN database 224b to "Switch File Written." In step 714, the first service 220 sees that the switch file 600 has been written and forwards an acknowledgment to the waiting SUT 301. In step 716, the first service 220 sets the status of the SUT 301 in the DVLAN database 224b to "Connected."

FIG. 7B illustrates a DVLAN database disconnect process 720 with respect to an SUT, such as the SUT 301. In step 722, the first service 220 requests an SUT disconnect. In step 724, the disconnect request is stored in the DVLAN database 224b. In step 726, the second service 222 sees the disconnect request and sets the status of the SUT 301 in the DVLAN database 224b to "Waiting for Switch File." In step 728, the second service 222 sets the status of the SUT 301 in the DVLAN database 224b to "Switch File Written." In step 730, the first service 220 sees that the switch file 600 has been written and forwards an acknowledgment to the waiting SUT 301. In step 732, the first service 220 sets the status of the SUT 301 in the DVLAN database 224b to "Disconnected."

Figure 8:
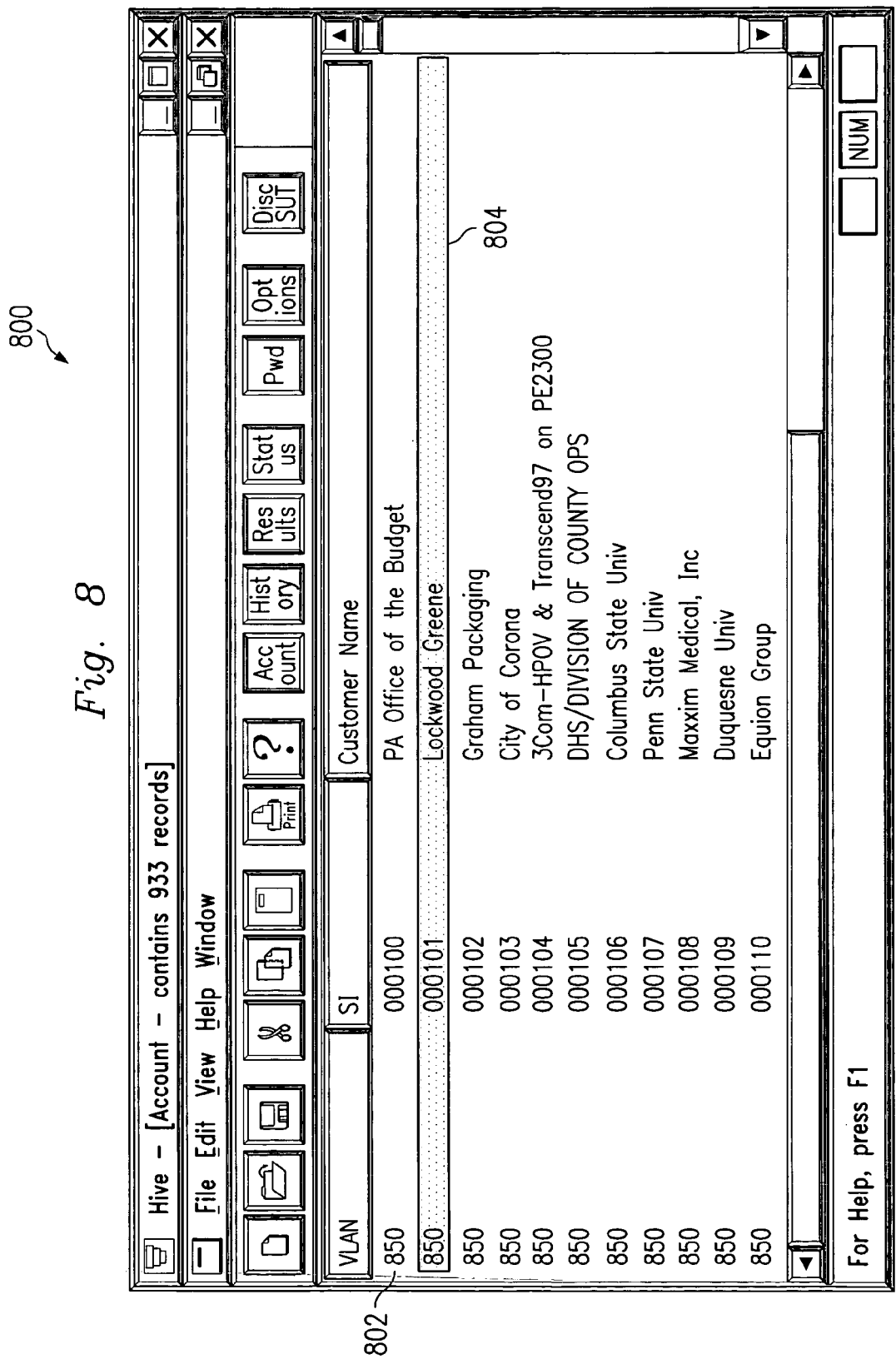
FIG. 8 illustrates an embodiment of a GUI screen display for associating VLANs with customer SI numbers.

FIG. 8 illustrates a GUI screen 800 for use by a manufacturing system administrator to add, change, and/or delete entries in the SI account table 226 in the DVLAN database 224b. This information must be kept current at all times to ensure that SUTs will be able to connect to the correct VLAN during the manufacturing process. As illustrated in FIG. 8, a first entry 802 associates an SI account number of 000100 (Customer Name "PA Office of the Budget") with VLAN 850. Similarly, a second entry 804 associates an SI account number of 000101 (Customer Name "Lockwood Greene") with VLAN 850.

Figure 9:
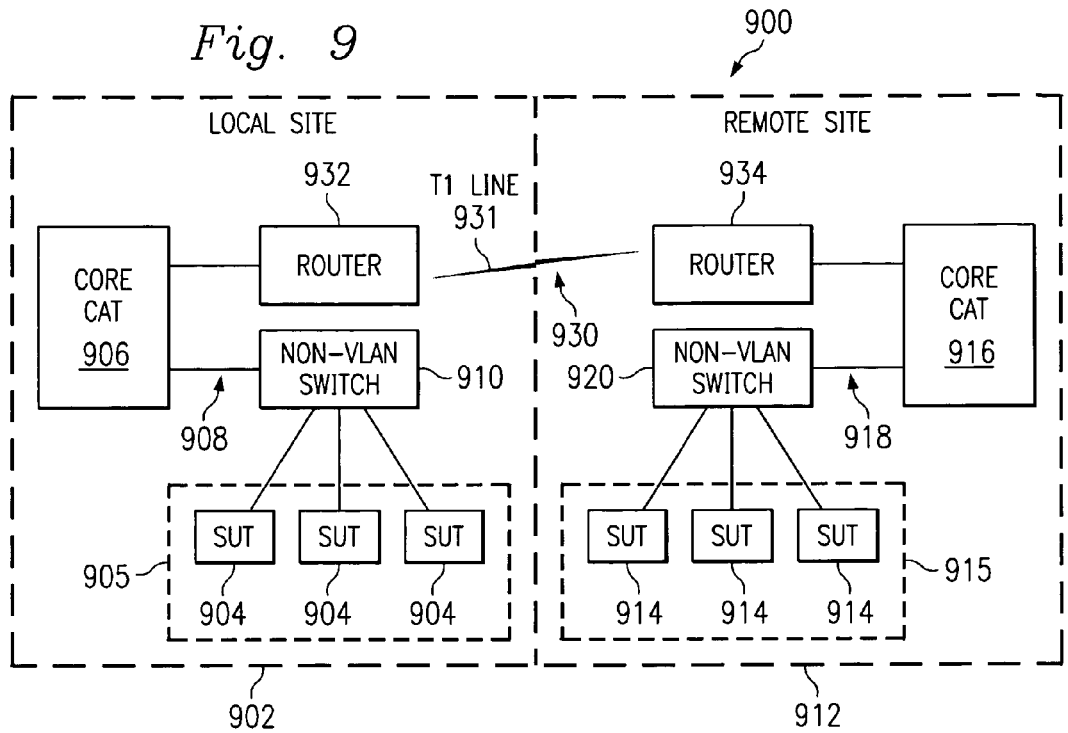
FIG. 9 is a system block diagram illustrating an implementation of a site-to-site DVLAN arrangement according to one embodiment.

FIG. 9 is a system block diagram illustrating an implementation of a site-to-site DVLAN arrangement 900 according to one embodiment. As illustrated in FIG. 9, at a local site 902, a plurality of SUTs 904 on a single virtual private network ("VPN") 905 are connected to a core CAT 906 via an Ethernet link 908 including a non-VLAN-capable switch 910. The Ethernet link 908 promotes only the single VPN to which the SUTs 904 are connected; i.e., the VPN 905. At a remote site 912, a similar arrangement exists; that is, a plurality of SUTs 914 on the VPN 905 are connected to a core CAT 916 via an Ethernet link 918 including a non-VLAN-capable switch 920. Although not shown in FIG. 9, it will be recognized that the SUTs 904, 914, will typically reside in burn racks. Again, the Ethernet link 918 promotes only the VPN 905. The core CATs 906, 916, are connected to one another via a private T1 link 930 that includes a T1 line 931 and two small private routers 932, 934, located at the local and remote sites 902, 912, respectively. Again, the T1 link 930 promotes only the single VPN 905.

It will be recognized that, although effective, the arrangement 900 is not scalable. The arrangement 900 enables a single VPN at a time used for a specific customer to be routed from one site to another. Clearly, this arrangement 900 would be expensive in cases where multiple VPNs must be routed from site to site.

Figure 10:
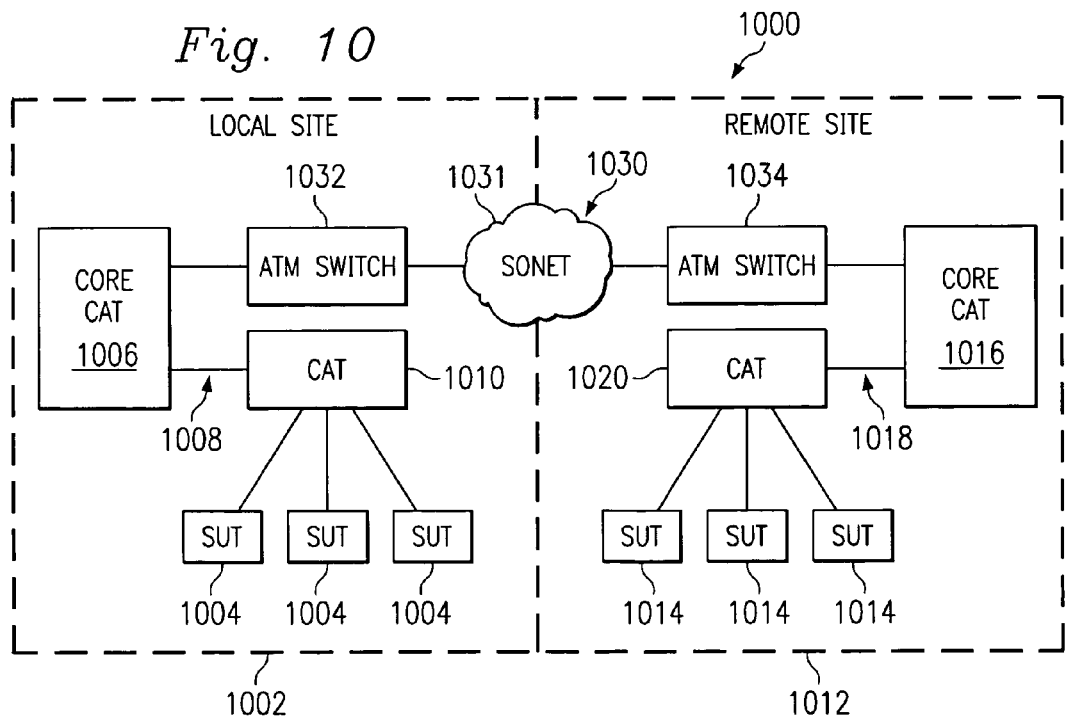
FIG. 10 is a system block diagram illustrating an implementation of a site-to-site DVLAN arrangement according to a second embodiment.

FIG. 10 is a system block diagram illustrating an implementation of a site-to-site DVLAN arrangement 1000 according to a second embodiment. As will be evident, the arrangement 1000, unlike the arrangement 900, is scalable. In FIG. 10, a local site 1002 includes a plurality of SUTs 1004 on multiple VPNs are connected to a core CAT 1006 via an Ethernet link 1008 including a CAT 1010, such that the Ethernet link 1008 is capable of promoting all of the various VPNs to which the SUTs 1004 are connected. A similar arrangement exists at a remote site 1012, a plurality of SUTs 1014 on multiple VPNs are connected to a core CAT 1016 via an Ethernet trunk 1018 including a CAT 1020. Although not shown in FIG. 10, it will be recognized that the SUTs 1004, 1014, will typically reside in burn racks. Again, the Ethernet link 1018 is capable of promoting all of the various VPNs to which the SUTs 1014 are connected.

The core CATs 1006, 1016, are connected to one another via an ATM connection 1030 that includes a SONET connection 1031 and two ATM switches 1032,1034, located at the local and remote sites 1002, 1012, respectively. This is accomplished by the core CATs 1006, 1016, which convert the private networks from "Frame" to "Cell", or from Ethernet ("Fast" or "Gig") to ATM ("OC-3" or "OC-12"), and vice versa, thus enabling the VPNs to be communicated between facilities, and then converted back to Frame/Ethernet by the core CAT 1006, 1016, at the destination. This allows for private communications over shared communications path., both reducing the cost of purchasing additional high-speed connections and hardware. With the arrangement 1000, up to 255 separate VPNs can be transmitted from site-to-site.

Figure 11:
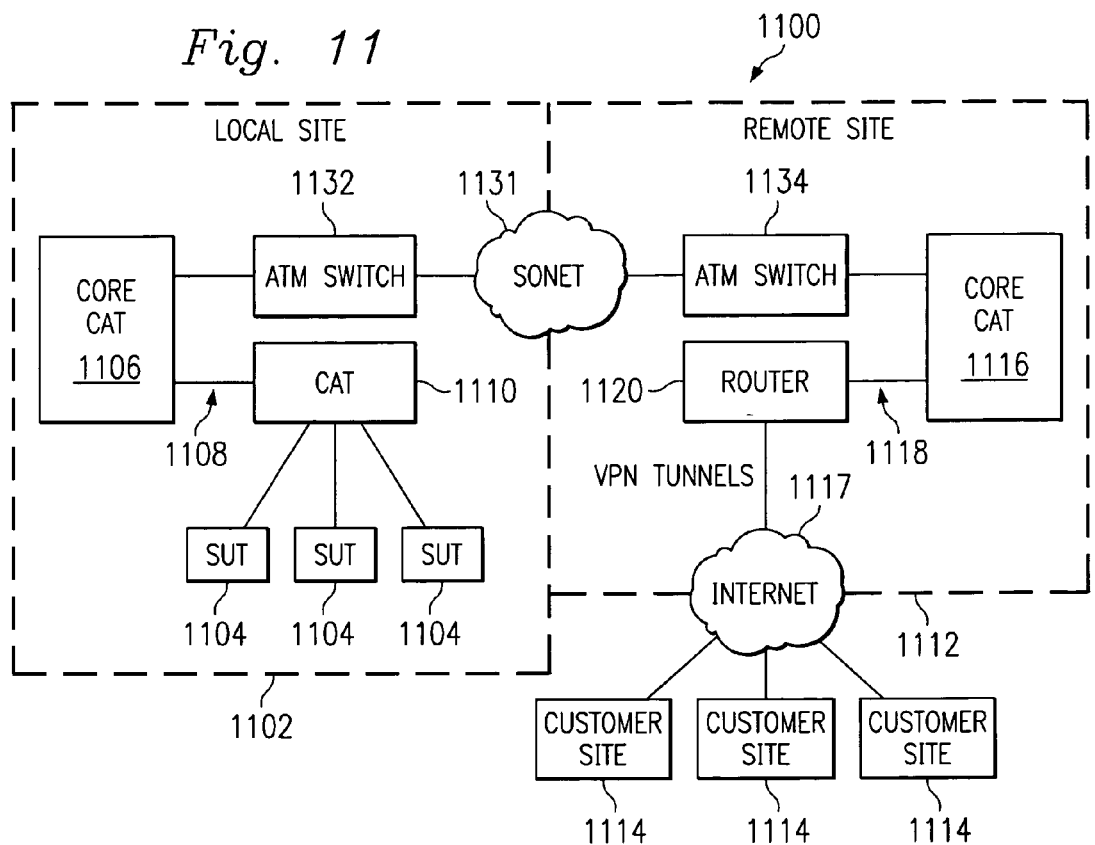
FIG. 11 is a system block diagram illustrating an implementation of a site-to-site DVLAN arrangement according to a third embodiment.

FIG. 11 is a system block diagram illustrating an implementation of a site-to-site DVLAN arrangement 1100 according to a third embodiment. As will be evident, the arrangement 1100, like the arrangement 1000, is scalable. In FIG. 11, a local site 1102 includes a plurality of SUTs 1104 on multiple VPNs are connected to a core CAT 1106 via an Ethernet link 1108 including a CAT 1110, such that the Ethernet link 1108 is capable of promoting all of the various VPNs to which the SUTs 1104 are connected. Although not shown in FIG. 11, it will be recognized that the SUTs 1104 will typically reside in burn racks. At a remote site 1112, a plurality of customer sites 1114 are connected to a core CAT 1116 via an Internet connection 1117, which is made up of VPN "tunnels" established over the Internet to customer sites 1114, and an Ethernet link 1118 including a shared router 1120 such that the Ethernet link 1118 is capable promoting all of the various VPNs to which the SUTs 1104 are connected. The customer sites 1114 include Internet connections and VPN servers or routers that complete the point-to-point VPN tunnels promoting the customer's specific VPN.

The core CATs 1106,1116, are connected to one another via an ATM connection 1130 that includes a SONET connection 1131 and two ATM switches 1132,1134, located at the local and remote sites 1102,1112, respectively. As described above with reference to FIG. 10, this is accomplished by the core CATs 1106, 1116, which convert the private networks from "Frame" to "Cell", or from Ethernet ("Fast" or "Gig") to ATM ("OC-3" or "OC-12"), and vice versa, thus enabling the VPNs to be communicated between facilities, and then converted back to Frame/Ethernet by the core CAT 1106,1116, at the destination. This allows for private communications over a shared communications path, both reducing the cost of purchasing additional high-speed connections and hardware.

The arrangement 1100 enables connection between a manufacturer's manufacturing network and a customer's network without requiring a high-speed link between the customer site 1114 and the remote site 1112 (see FIG. 12) or requiring that the customer provide to the manufacturer a dedicated server to install at the remote site 1112 for enabling custom configuration of the customer's SUTs as described above.

Figure 12:
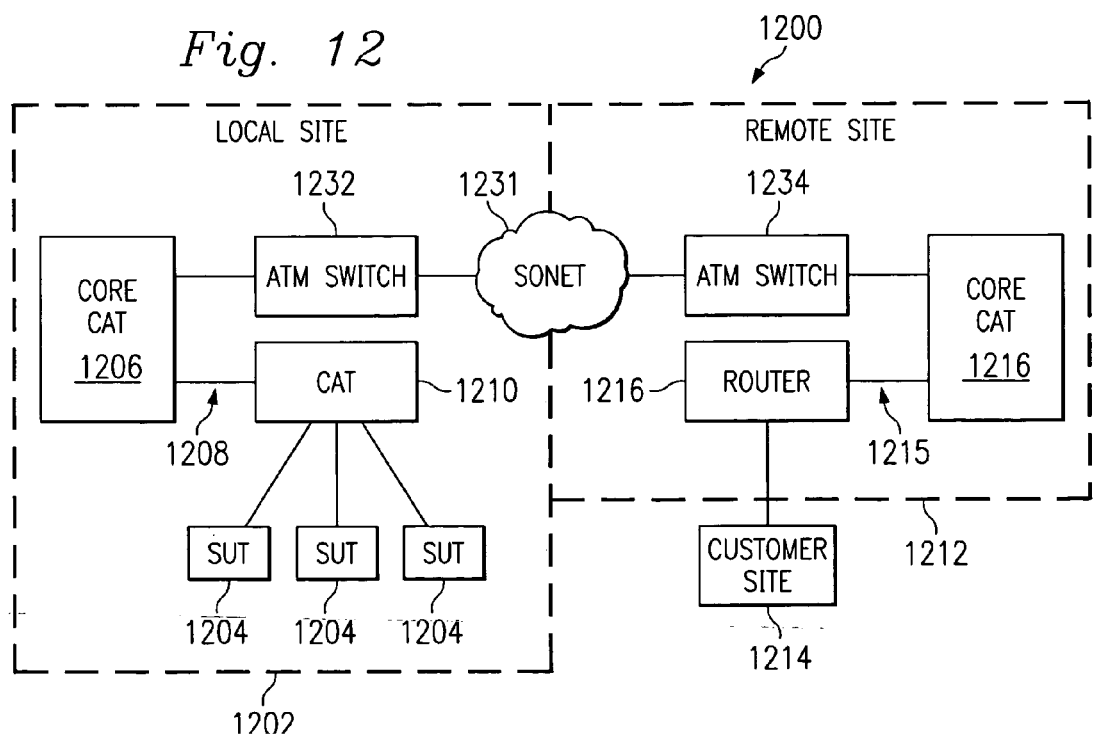
FIG. 12 is a system block diagram illustrating an implementation of a site-to-site DVLAN arrangement according to a fourth embodiment.

FIG. 12 is a system block diagram illustrating an implementation of a site-to-site DVLAN arrangement 1200 according to a fourth embodiment. As will be evident, the arrangement 1200, like the arrangements 1000 and 1100, is scalable. In FIG. 12, a local site 1202 includes a plurality of SUTs 1204 on multiple VPNs are connected to a core CAT 1206 via an Ethernet link 1208 including a CAT 1210, such that the Ethernet link 1208 is capable of promoting all of the various VPNs to which the SUTs 1204 are connected. Although not shown in FIG. 12, it will be recognized that the SUTs 1204 will typically reside in burn racks. At a remote site 1212, a single customer site 1214 is connected to a core CAT 1216 via a private high-speed connection 1215, such as a frame-relay or ISDN connection, including a router 1216, for providing a point-to-point connection between the customer site 1214 and the remote site 1212.

The core CATs 1206, 1216, are connected to one another via an ATM connection 1230 that includes a SONET connection 1231 and two ATM switches 1232,1234, located at the local and remote sites 1202, 1212, respectively. As described above with reference to FIG. 10, this is accomplished by the core CATs 1206, 1216, which convert the private networks from "Frame" to "Cell", or from Ethernet ("Fast" or "Gig") to ATM ("OC-3" or "OC-12"), and vice versa, thus enabling the VPNs to be communicated between facilities, and then converted back to Frame/Ethernet by the core CAT 1206, 1216, at the destination. The arrangement 1200, a point-to-point connection is established with the customer site 1214, such that a continuation of the customer's network virtually resides on the VPN at the manufacturer's manufacturing facility for custom configuration of the customer's SUTs.

It should be noted that the arrangements described above with reference to FIGS. 9-12 enable the manufacture to perform custom configuration of all SUTs for a given customer and to provide "network-in-a-can" solutions to customers. To this end, the customer has several options as to how to provide to the manufacture the information needed to perform the custom configuration. For example, the arrangement 1000 shown in FIG. 10 could be used if the customer chooses to provide to the manufacture a back up server containing proprietary information for use in the custom configuration process. In this scenario, the server would be connected to the VPN of the customer at the remote site 1012. The arrangement 1200 shown in FIG. 12 could be used in cases where the customer is willing and able to provide an additional high-speed connection out of their network to the manufacturer's's manufacturing facility. As previously indicated, the arrangement 1200 incorporates the customer's network onto the associated VPN at the manufacture, thus enabling custom configuration to be performed. Finally, the arrangement 1100, shown in FIG. 11 could be used in cases where the customer is unwilling or unable either to provide a server to the manufacture or to support an additional high-speed connection out of their network.

In one variation on these embodiments, the means for connecting includes a first router located at the first site and connected to the first VLAN-capable switch, a second router located at the second site and connected to the second VLAN-capable switch, and a T1 line connecting the first and second routers. In another variation on this embodiment, the means for connecting includes a first ATM switch located at the first site and connected to the first VLAN-capable switch, a second ATM switch located at the second site and connected to the second VLAN-capable switch, and a SONET connection between the first ATM switch to the second ATM switch.

In an alternative embodiment, the system includes a first VLAN-capable switch located at a first site; a first system under test ("SUT") located at the first site and connected to the first VLAN-capable switch via a first burn rack switch; a second VLAN-capable switch located at a second site remote from the first site; a customer network located at a customer site remote from the first and second sites and connected to the second VLAN-capable switch via a router; and an ATM connection between the first and second VLAN-capable switches such that the first SUT and the customer network are connected to a single virtual private network ("VPN"). In addition, the system may include a second SUT located at the first site and connected to the first VLAN-capable switch via the first burn rack switch and a second customer network at a second customer site located remote from the first and second sites and connected to the second VLAN-capable switch via a router, wherein the first SUT and the first customer network are connected via a first VPN and the second SUT and the second customer network are connected via a second VPN. In one variation on this alterative embodiment, the connection between the second site and customer site is an Internet connection. In another variation on this alternative embodiment, the connection between the second site and the customer site is a high speed point-to-point connection.

Although an illustrative embodiment has been shown and described, other modifications, changes, and substitutions are intended in the foregoing disclosure. Accordingly, it is appropriate that the appended claims be construed broadly and in a manner consistent with the scope of the disclosure.

What is claimed is:

1. A system for dynamically implementing a virtual LAN (VLAN) across multiple sites, the system comprising:
   a first VLAN-capable switch located at a local site;
   a first uniquely identified system under test (first SUT) located at the local site and connected to the first VLAN-capable switch;
   a second VLAN-capable switch located at a remote site;
   a second uniquely identified SUT (second SUT) located at the remote site and connected to the second VLAN-capable switch;
   a connection between the first VLAN-capable switch and the second VLAN capable switch such that the first and second SUTs are dynamically connected to or disconnected from a VLAN; and
   a local burn rack located at the local site for receiving the first SUT and a remote burn rack located at the remote site for receiving the second SUT such that the first and second SUTs are tested and software is configured while operating together on the VLAN.

2. The system of claim 1 wherein the local site is a manufacturing facility.

3. The system of claim 1 wherein the remote site is a manufacturing facility.

4. The system of claim 1 wherein the remote site is a customer's site.

5. The system of claim 1 wherein the remote site is a customer's server.

6. The system of claim 1 wherein the VLAN is private.

7. A system for dynamically implementing a virtual LAN (VLAN) across multiple sites, the system comprising:
   a first VLAN-capable switch located at a local site;
   a plurality of first uniquely identified systems under test (SUTs) located at the local site and connected to the first VLAN-capable switch;
   a second VLAN-capable switch located at a remote site;
   a plurality of second uniquely identified SUTs, located at the remote site and connected to the second VLAN-capable switch;
   a connection between the first VLAN-capable switch and the second VLAN capable switch such that first and second SUTs are dynamically connected to or disconnected from a VLAN; and
   a local burn rack located at the local site for receiving the plurality of first SUTs and a remote burn rack located at the remote site for receiving the plurality of second SUTs such that first and second SUTs are tested and software is configured while operating together on the VLAN.

8. The system of claim 7 wherein the local site is a manufacturing facility.

9. The system of claim 7 wherein the remote site is a manufacturing facility.

10. The system of claim 7 wherein the remote site is a customer's site.

11. The system of claim 7 wherein the remote site is a customer's server.

12. The system of claim 7 wherein the VLAN is private.

13. A system for dynamically implementing a virtual LAN (VLAN) across multiple sites, the system comprising:
   a first VLAN-capable switch located at a local site;
   a plurality of uniquely identified systems under test (SUTs) located at the local site and connected to the first VLAN-capable switch;
   a second VLAN-capable switch located at a remote site;
   a plurality of customer sites connected to the remote site;
   a connection between the first VLAN-capable switch and the second VLAN capable switch such that the plurality of SUTs and the plurality of customer sites are dynamically connected to or disconnected from a VLAN; and
   a local burn rack located at the local site for receiving the plurality of SUTs such that the plurality of SUTs are tested and software is configured while operating together on the VLAN.

14. The system of claim 13 wherein the plurality of customer sites is connected to the remote site by an Internet connection therebetween.

15. The system of claim 13 wherein the local site is a manufacturing facility.

16. The system of claim 13 wherein the remote site is a manufacturing facility.

17. The system of claim 13 wherein the plurality of customer sites includes customer's servers.

18. A system for dynamically implementing a virtual LAN (VLAN) across multiple sites, the system comprising:
   a first VLAN-capable switch located at a local site;
   a plurality of uniquely identified systems under test (SUTs) located at the local site and connected to the first VLAN-capable switch;
   a second VLAN-capable switch located at a remote site;
   a plurality of customer sites connected to the remote site;
   a connection between the first VLAN-capable switch and the second VLAN capable switch such that the plurality of SUTs and the plurality of customer sites are dynamically connected to or disconnected from a VLAN; and
   a local burn rack located at the local site for receiving the plurality of SUTs such that the plurality of SUTs are tested and software is configured while operating together on the VLAN using information from a customer site to configure the plurality of SUTs.

19. A system for dynamically implementing a virtual LAN (VLAN) across multiple sites, the system comprising:
   a first VLAN-capable switch located at a local site;
   a plurality of uniquely identified systems under test (SUTs) located at the local site and connected to the first VLAN-capable switch;
   a second VLAN-capable switch located at a remote site;
   a plurality of customer sites connected to the remote site;
   a connection between the first VLAN-capable switch and the second VLAN capable switch such that the plurality of SUTs and the plurality of customer sites are dynamically connected to or disconnected from a VLAN; and
   a local burn rack located at the local site for receiving the plurality of SUTs such that the plurality of SUTs are tested and software is configured while operating together on the VLAN using information from a plurality of customer sites to configure the plurality of SUTs.

20. A system for dynamically implementing a virtual LAN (VLAN) across multiple sites, the system comprising:
   a first VLAN-capable switch located at a local site;
   a plurality of uniquely identified systems under test (SUTs) located at the local site and connected to the first VLAN-capable switch;
   a second VLAN-capable switch located at a remote site;
   a customer site connected to the remote site;
   a connection between the first VLAN-capable switch and the second VLAN capable switch such that the plurality of SUTs and the customer site are dynamically connected to or disconnected from a VLAN; and a local burn rack located at the local site for receiving the plurality of SUTs such that the plurality of SUTs is tested and software is configured while operating together on the VLAN.

21. The system of claim 20 wherein the customer site is connected to the remote site by a router.

22. The system of claim 20 wherein the local site is a manufacturing facility.

23. The system of claim 20 wherein the remote site is a manufacturing facility.

24. The system of claim 20 wherein the customer site is a customer server.

25. The system of claim 20 wherein the customer site includes configuration information.

26. A system for dynamically implementing a virtual LAN (VLAN) across multiple sites, the system comprising:
   a first VLAN-capable switch located at a local site;
   a plurality of uniquely identified systems under test (SUTs) located at the local site and connected to the first VLAN-capable switch;
   a second VLAN-capable switch located at a remote site;
   a customer site connected to the remote site;
   a connection between the first VLAN-capable switch and the second VLAN capable switch such that the plurality of SUTs and the customer site are dynamically connected to or disconnected from a VLAN; and
   a local burn rack located at the local site for receiving the plurality of SUTs such that the plurality of SUTs are tested and software is configured while operating together on the VLAN using information from a customer site to configure the plurality of SUTs.

27. A method for dynamically implementing a virtual LAN (VLAN) across multiple sites, comprising:
   providing a first VLAN-capable switch located at a local site;
   locating a first uniquely identified system under test (first SUT) at the local site and connecting the first SUT to the first VLAN-capable switch;
   providing a second VLAN-capable switch located at a remote site;
   locating a second uniquely identified SUT (second SUT) at the remote site and connecting the second SUT to the second VLAN-capable switch;
   providing a connection between the first VLAN-capable switch and the second VLAN capable switch such that the first and second SUTs are dynamically connected to or disconnected from a VLAN; and
   locating a local burn rack at the local site for receiving the SUTs such that the SUTs are tested and software is configured while operating together on the VLAN.

* * * * *